Feb. 24, 1970  V. H. SIETMANN ET AL  3,497,229
PARTICULATE MATERIAL LEVELING DEVICE
Filed Feb. 5, 1968  2 Sheets-Sheet 1

INVENTORS
VERNON H. SIETMANN
GERALD F. DENDEL
By
Zarley, McKee & Thomte
ATTORNEYS

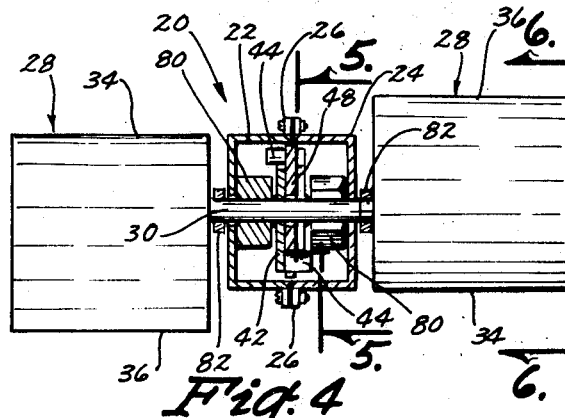
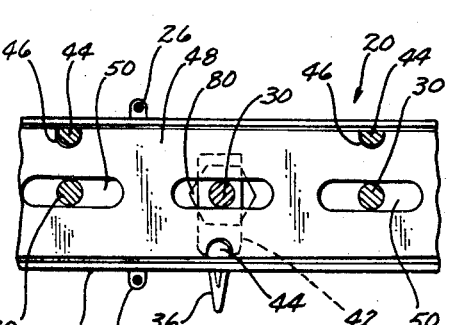
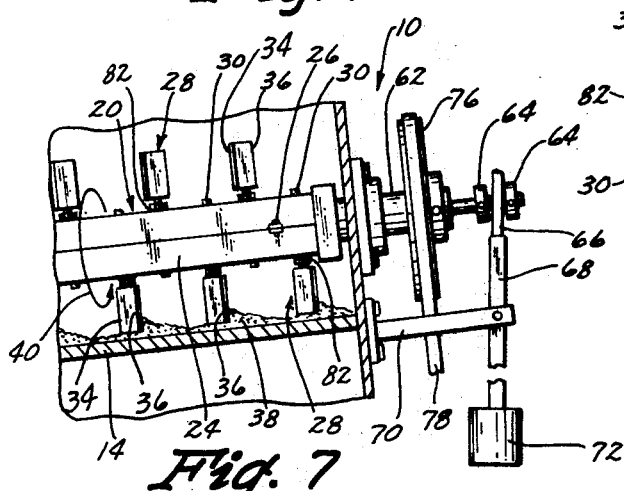
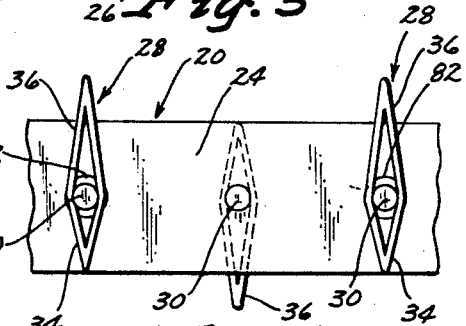
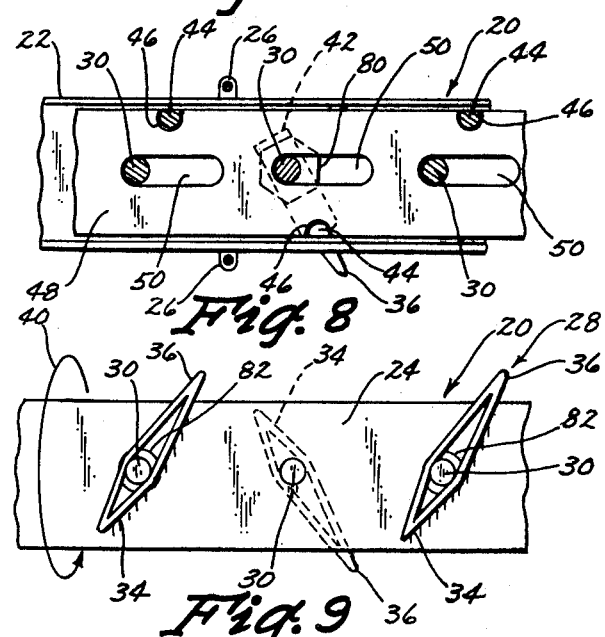
INVENTORS
VERNON H. SIETMANN
GERALD F. DENDEL
BY
Zarley, McKee & Thomte
ATTORNEYS

United States Patent Office 3,497,229
Patented Feb. 24, 1970

3,497,229
PARTICULATE MATERIAL LEVELING DEVICE
Vernon H. Sietmann, Laurel, Iowa 50141, and Gerald F. Dendel, 216 E. 16th St., Costa Mesa, Calif. 92627
Filed Feb. 5, 1968, Ser. No. 703,012
Int. Cl. A01f 7/02
U.S. Cl. 280—6.1
8 Claims

ABSTRACT OF THE DISCLOSURE

A leveling device responsive to a pendulum for guiding flowable material in a container to a level and uniformly distributed condition when the container is tilted relative to the horizontal in either direction along a line parallel to the longitudinal axis of the leveler device. The leveler device includes a plurality of longitudinally and circumferentially spaced apart pivotal wings connected by a cam means to a pendulum. The leveler device may be used in a combine over the chaffer or upper sieve.

---

A grain combine traveling over hilly land will tend to cause the thrashed grain coming from the conveyor chain to the cleaning sieve to bunch up on one side or the other of the combine due to the slope of the hill over which the combine is moving. This leveler device will be positioned in the area of the grain adjacent the sieve such that the grain is always maintained in a level and uniformly distributed condition to maximize the cleaning of the grain.

The leveler device will be continually rotated and will have adjustable flights thereon which are continuously variable in response to the movement of a pendulum which senses the contour of the land. When the land is leveled the flights on the leveler device will be in a neutral position and will not affect the grain but when the ground is sloped the flights will tend to auger the grain against the forces of gravity back to a uniformly distributed condition.

These and other features and advantages of this invention will become readily apparent to those skilled in the art upon reference to the following description when taken into consideration with the accompanying drawings, wherein:

FIG. 4 is a cross-sectional view taken along line 4—4 in FIG. 3;

FIG. 5 is a cross-sectional view taken along line 5—5 in FIG. 4;

FIG. 6 is an end view of the leveler device taken along line 6—6 in FIG. 4;

FIG. 7 is a fragmentary side elevation view of the leveler device in operation;

FIG. 8 is a side elevation cross-sectional view of the leveler device having been actuated; and FIG. 9 is a side elevation view of the leveler device in the position illustrated in FIG. 8 showing the flights having maximum pitch.

Figure 2:
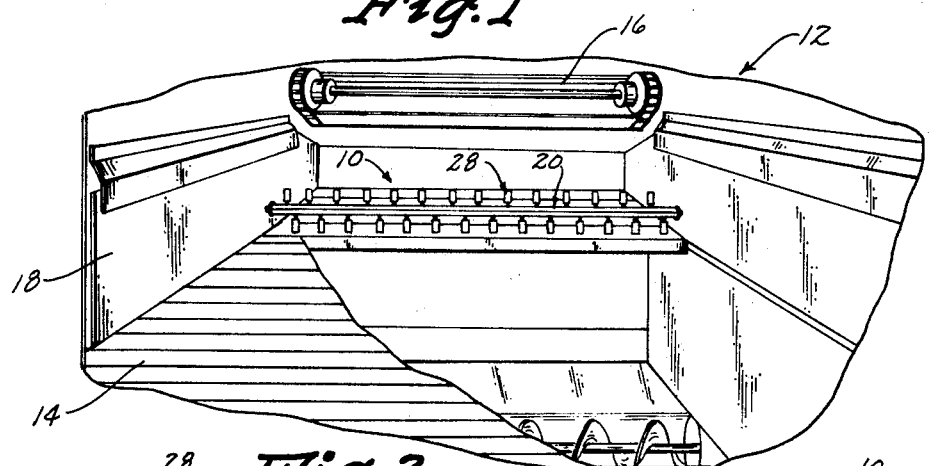
FIG. 2 is a fragmentary internal view of the leveler device in the combine over the upper sifting screen.

The leveler device of this invention is referred to generally in FIG. 2 by the reference numeral 10 and is shown mounted on a combine 12 over an upper cleaning sieve or chaffer 14 which is being fed thrashed grain from a conveyor chain 16. The leveler device 10 extends transversely of the grain cleaning compartment 18.

Figure 3:
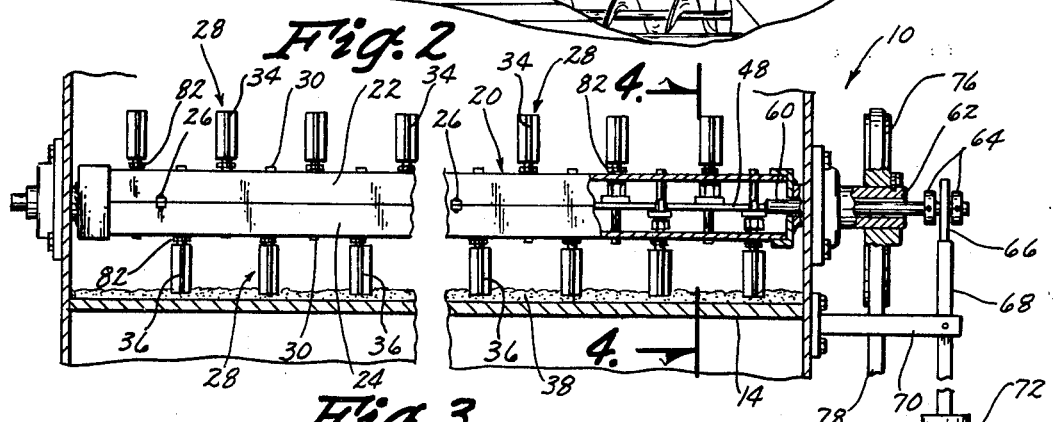
FIG. 3 is a cross-sectional view taken along line 3—3 in FIG. 1.

In FIG. 3 it is seen that the leveler device 10 includes an elongated member 20 formed by a pair of channel sections 22 and 24 facing each other and bolted together by fasteners 26. Along the length of the member 20, flights 28 are positioned on opposite sides 180 degrees apart and are staggered therealong. Each of the flights include a pivot pin 30 which extends through both channels 22 and 24. The paddle-shaped flights are mounted off the transverse center line therethrough and thus the paddle-shaped flights include large and small paddle portions 36 and 34 respectively. The outer ends of each of the paddle portions are tapered edges formed by the covering sidewalls extending from the pivot pin. It is seen in FIG. 6 that the shorter paddle portion 34 is of a length such that it will extend only to the outer side of the elongated member 20. In operation the longer paddle portion 36 is the trailing portion while the shorter paddle portion 34 is the leading paddle portion. The paddle flights by being mounted off center on the pivot pins 30 provide a desired balance when working on grain 38 (FIG. 7) since as the leveler rotates in the direction indicated by the arrow 40 the shorter paddle portion 34 cuts into the grain 38 and receives the maximum resistance from the grain compared to the trailing paddle portion 36 which engages the grain after the member 30 has rotated partially out of the grain.

A plate lever arm 42 is seen in FIGS. 4, 5 and 8 perpendicularly connected to the pivot pin 30 and being provided with a perpendicularly extending shoulder pin 44 on its outer end which is received in an arcuate recess 46 on a cam actuating plate 48 movable along the longitudinal center of the member 20. It is seen that the actuating plate member 48 is provided with longitudinally extending elongated holes 50 through which the pins 30 extend. The actuating plate may move the length of the holes 50.

As seen in FIG. 3, the cam actuating plate 48 includes an inner shaft 60 which extends outwardly of the end of the member 20 through a drive shaft 62 connected to the member 20. The outer end of the shaft 60 is provided with a pair of spaced apart shoulders 64 between which a fork member 66 extends and engages the shaft 60. The fork member 66 is on the outer end of a pendulum member 68 pivotally connected to a support 70 and having a weight or ballast 72 at its lower end. The pendulum arm 68 is adapted to pivot in a plane parallel to the longitudinal axis of the rotating member 20 to sense lateral sloping of the compartment 18 in the combine 12.

Figure 1:
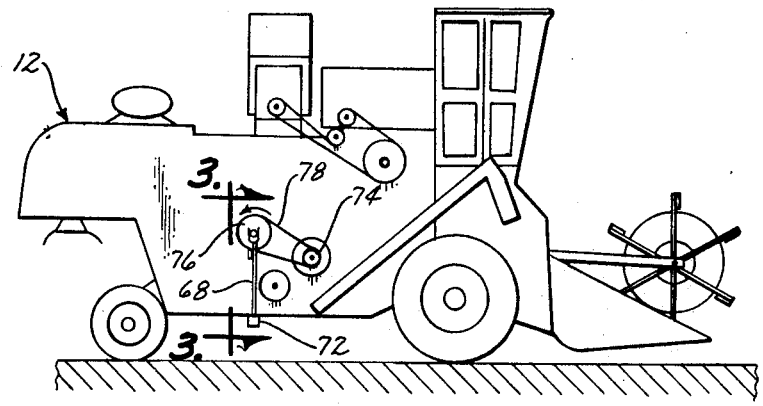
FIG. 1 is a side elevation view of a combine employing the leveler device of this invention.

The member 20 is being continually rotated by a conventional power source such as the drive pulley 74 on the combine in FIG. 1 which is coupled to a pulley 76 on the shaft 62 of the leveler device member 20. The power is supplied through a belt 78. The speed of the rotation for the leveler device may vary from 2 to 250 r.p.m.

Referring again to the means securing the flights 28 to the member 20 and the cam actuating plate 48 it is seen in FIG. 4 that each pin carries a single nut 80 welded thereon and to the lever plate 42 to occupy the space inside the member 22. A washer 82 is provided on the pin between the outside of the member 20 and the inside edge of the flight 28.

In operation it is seen that when the combine is operating on level ground the pendulum will remain vertical and perpendicular to the member 20 of the leveler unit and accordingly the flights 28 will remain oriented in planes perpendicular to the rotational axis of the member 20 as seen in FIGS. 3 and 6 and accordingly flights 28 will pass through the grain 38 without deflecting it laterally in either direction. However, when the combine tilts to the left as seen in FIG. 7 the pendulum arm 68 is at an acute angle with the center rotational axis of the member 20 and accordingly the actuating plate 48 is pulled outwardly causing the pins 44 on the plate arms 42 mounted on the pivotal pins 30 to pivot and consequently pivot the flights 28 to the positions seen in FIGS. 7, 8 and 9. If the combine should tilt in the opposite direction then of course the pendulum arm 28 would swing outwardly and push the actuating plate 48 inwardly causing the flights to pivot in the opposite direction and conversely the grain would be augered in the opposite direction tending to keep it evenly distributed over the floor 14. It is noted that both sides of the flights 28 are used, one side being used when the flights are turned in one direction and the other side being used when the flights are turned in the opposite direction. Furthermore, by rotating the member 20 to cause the shorter paddle portions 34 to engage the grain 38 first there is a minimum chance of straw and other foreign material collecting on the shafts 30 and the paddles since there is less of a projection and no projection beyond the outer surface of the channel-shaped member 20 as seen in FIG. 6.

Moreover, it is seen that the pitch of the paddles is continuously variable by operation of the gravity operated pendulum and accordingly auxiliary hydraulic or electrical power means is not required. The member 20 is easily rotated by any available power source as seen at 74 in FIG. 1.

Some changes may be made in the construction and arrangement of our particulate material leveling device without departing from the real spirit and purpose of our invention.

We claim:

1. A mobile machine for conditioning grain or the like comprising,
    a compartment having a horizontally disposed bottom,
    a grain leveler unit in said compartment above said bottom, said leveler having a rotatable frame member extending across said compartment parallel and adjacent said bottom,
    a plurality of pivotal flights spaced along the length and around the periphery of said frame member, the axis of pivotal movement of said flights being perpendicular to the longitudinal and rotational axis of said frame member,
    an actuating member engaging each of said pivotal flights, and
    a level sensing means connected to said actuating member, and said level sensing means being movable in response to vertical changes in the position of the rotational axis of said frame member relative to the horizontal to pivot said flights from a neutral first position to oppositely extending second and third positions as said rotational axis moves between opposite sides of the horizontal, and said flights being in said neutral first position when said rotational axis is horizontally disposed.

2. A leveler unit for flowable material, comprising,
    a rotatable frame member having a plurality of flights,
    adjustable means for varying the angle of said flights relative to the axis of rotation of said frame member, said flights being adjustable between a neutral first position extending perpendicular to the axis of rotation of said frame member to second and third portions extending in opposite directions along said axis of rotation, and
    sensing means being connected to said adjustable means, said sensing means being responsive to vertical changes in the position of said rotational axis of said frame member relative to the horizontal to move said flights between said second and third positions as said rotational axis moves between opposite sides of the horizontal, and said flights being in said neutral first position when said rotational axis is horizontally disposed.

3. The structure of claim 2 wherein said sensing means is a vertically disposed pendulum.

4. The structure of claim 2 wherein said frame member is elongated and said plurality of flights are spaced apart along the length and around the periphery thereof.

5. The structure of claim 4 wherein said flights are movable between said first, second and third positions by being pivotal about axes perpendicular to said rotational axis of said frame member.

6. The structure of claim 5 wherein said frame member includes an internal actuating cam member movable longitudinally thereof, said flights being pivotally connected to said frame member on pins extending into said frame member for engagement with said actuating cam means whereby said flights are pivoted as said actuating cam means is moved longitudinally.

7. The structure of claim 6 wherein said pins include actuating arms extending perpendicularly to the axis of said pins and engaging said actuating cam means.

8. The structure of claim 6 wherein said flights are mounted on said pins along lines offset from their transverse center lines.

References Cited
UNITED STATES PATENTS

| | | | |
|---|---|---|---|
| 558,738 | 4/1896 | Neal | 198—216 XR |
| 728,460 | 5/1903 | Hart | 198—216 |
| 2,675,809 | 4/1954 | Aber et al. | |
| 2,692,679 | 10/1954 | Lindberg et al. | |

ALBERT J. MAKAY, Primary Examiner

U.S. Cl. X.R.
130—27; 198—216